(12) United States Patent
Strandemar et al.

(10) Patent No.: US 8,680,468 B2
(45) Date of Patent: Mar. 25, 2014

(54) DISPLACEMENT-BASED FOCUSING OF AN IR CAMERA

(75) Inventors: Katrin Strandemar, Rimbo (SE); Björn Roth, Hägersten (SE); Magnus Boman, Täby (SE)

(73) Assignee: FLIR Systems AB, Danderyd (SE)

( * ) Notice: Subject to any disclaimer, the term of this patent is extended or adjusted under 35 U.S.C. 154(b) by 835 days.

(21) Appl. No.: 12/684,853

(22) Filed: Jan. 8, 2010

(65) Prior Publication Data

US 2011/0168890 A1    Jul. 14, 2011

(51) Int. Cl.
*G01J 5/02*      (2006.01)
*H01L 31/00*    (2006.01)

(52) U.S. Cl.
USPC .......................................... 250/348; 250/330

(58) Field of Classification Search
USPC .................................. 250/330, 347, 348, 353
See application file for complete search history.

(56) References Cited

U.S. PATENT DOCUMENTS

2006/0076472 A1*    4/2006    Dosluoglu et al. .......... 250/208.1

* cited by examiner

*Primary Examiner* — David Porta
*Assistant Examiner* — Carolyn Igyarto
(74) *Attorney, Agent, or Firm* — Haynes and Boone, LLP

(57) ABSTRACT

An IR camera includes a first optical subsystem for generating an IR image of an object and a second optical subsystem for generating a visual light image of the object. The IR camera further includes a focusing device for focusing the first optical subsystem. The IR camera also has a processor for determining a focus distance for focusing the first optical subsystem on the object. The processor determines the focus distance based on a displacement of a feature in the visual light image.

14 Claims, 3 Drawing Sheets

DISPLACEMENT-BASED FOCUSING OF AN IR CAMERA

BACKGROUND

1. Field

Embodiments of the invention relate to an infrared ("IR") camera and a method for focusing an IR camera.

2. Related Art

Over the last few years, an increasing number of IR cameras also comprise a visual light imaging subsystem for generating digital images in the visible light range. Such cameras often also comprise functions for fusing or blending the visible light images and the IR images in various ways. Typically, the visible light imaging subsystem has a fixed focus, or an autofocus function according to prior art methods.

The visible light imaging subsystem may have a substantially larger field of view than the IR imaging subsystem. Also, the imaging focal plane array of the visible imaging system may have a higher resolution than that of the IR imaging system. Therefore, the IR and visual images must be aligned before they can be blended, or fused. Aligning the images may include applying a scale factor and X/Y offset to one of the images to make objects in the plane of focus appear in the same scale and position in both images when they are overlaid each other using the same pixel grid. Typically the scale factor is fixed and the offset is a linear function of focus distance. It is known in the art how to adjust the two images to the same scale.

The displacement or offset between the IR and visual images means that an object will be found at different positions in the two images. Two main factors contribute to this displacement. First, optical subsystems for IR imaging and visible light imaging are placed at a distance from each other on the camera, which causes a parallax error. Second, the optical axes of the IR and visual optical subsystems are typically not parallel and slightly skewed. This must be handled in each camera individually, which is typically done by registering the displacement between the IR and visual images at different distances to an object during calibration of the camera. How to do this is also known in the art.

It is common in the art to use a focus motor for focusing the IR optics. The focus motor must be controlled according to some focusing algorithm to focus the IR optics properly. Typically this is done by moving the lens to one of its extreme positions and then sliding it through its whole range to determine the position that gives the best focus. The lens is then moved to this position. This is time consuming and interrupts the imaging procedure. Thus, focusing can only be performed at times when the imaging procedure is not active. Accordingly, there is a risk that the camera will not keep its focus throughout the imaging procedure.

SUMMARY

In an exemplary embodiment of the invention, an IR camera can focus as often as desired or as necessary without causing unacceptable interruption in the imaging procedure. The IR camera includes a first optical subsystem for generating IR images of an object, a second optical subsystem for generating visual light images, a focusing device for focusing the first optical subsystem on the object, and a processor operable to determine a distance to the object in the IR image based on a displacement of a feature in the visual light image, wherein the processor is operable to focus the first optical subsystem on the object with the focusing device by setting the focus of the first optical subsystem based on the determined distance to the object.

The processor may be operable to determine the displacement parameter based on the displacement of the feature between the visual light image and the IR image. The displacement of the feature may be determined by gradually translating the IR image in a direction opposite a direction of displacement, determining the overlap, or separation between the IR image and the visual image, and repeating the translating and determining steps until the overlap or separation is within a predetermined threshold.

In an alternative embodiment, the IR camera may also include a laser device for generating a laser spot on the object. The laser spot may be the feature for determining the displacement parameter.

In another exemplary embodiment of the invention, a method for focusing an IR camera includes generating an IR image from a first optical subsystem, generating a visible light image from a second optical subsystem, determining a focus distance from the IR camera to the object based on a displacement of a feature of the visual light image, and focusing the first optical subsystem based on the determined distance from the IR camera to the object.

The method for focusing the IR camera may be performed as a series of computer instructions that may be stored on any type of computer-readable storage medium such as a CD, flash memory, firmware, RAM, or any other type of memory device. A processor in the camera may execute the instructions stored on the memory device, which may be part of the camera or an external memory device.

The focusing method according to the above embodiment may detect when the IR image is out of focus, since the visual image and the IR image will be displaced relative to each other. That is, the images will be perfectly aligned if the IR image is precisely focused. The magnitude of the displacement will depend on the focussing error. It should be noted that the displacement will always be along a well defined line given by the displacement between the IR optics and the visible light optics on the camera. Therefore, if the displacement in the horizontal direction is determined, the vertical displacement may be given, and vice versa. Hence, it may be sufficient to determine the displacement in one particular dimension to determine the overall displacement between the images.

The focusing method according to above embodiment may be faster than prior art methods and may be performed continuously or at regular intervals without having to defocus the IR image first. Thus, an IR camera using the method according to the embodiment above enables efficient focusing to be performed continuously or at regular intervals.

In an optional embodiment, a rough focusing can first be performed according to prior art methods before proceeding with the method according to the embodiment above. This is particularly useful in situations in which the focusing error of the IR optics is so large that no suitable feature or distinct characteristic can be identified in the IR image. A suitable distinct characteristic or feature will be an area providing sufficient contrast, for example a well defined edge.

DETAILED DESCRIPTION

Figure 1:
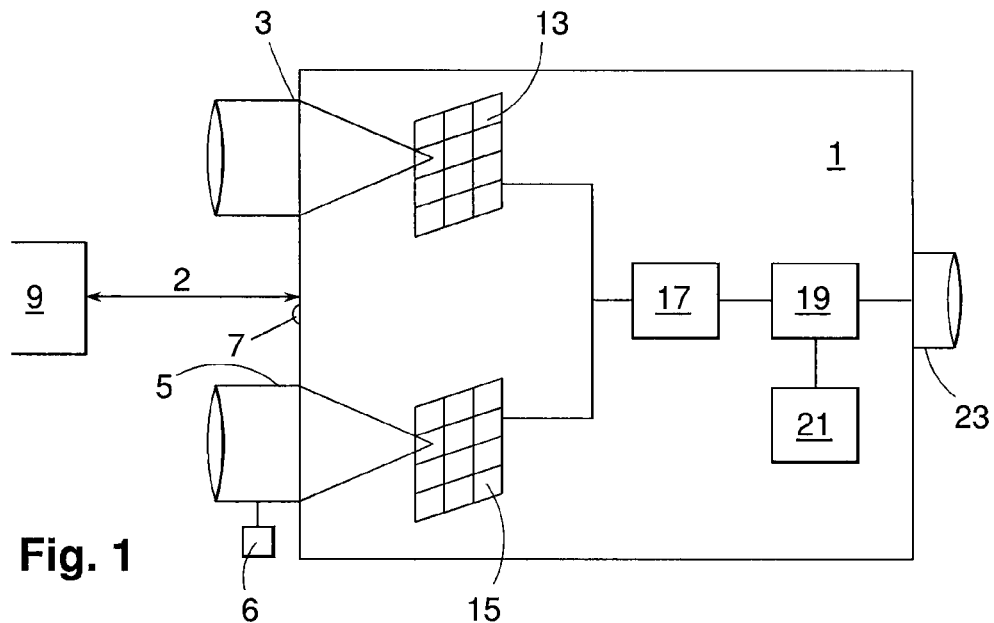
FIG. 1 is a block diagram of an IR camera according an exemplary embodiment of the invention.

FIG. 1 is a block diagram of a camera according to an exemplary embodiment of the invention. The camera comprises a first optical subsystem for generating IR images and a second imaging system for visible light images. The first optical subsystem includes IR optics 5, a focus motor 6, and the IR imaging array 15. The second optical subsystem includes visible light optics 3 and the visible light imaging array 13. Optionally, the camera also includes a laser pointing device 7, for emitting a laser beam that will generate a laser spot on an imaged object 9. The optics 5, 3 of each imaging system focuses incoming radiation in the relevant wavelength range on to the imaging arrays 15, 13, respectively. The data from the imaging arrays 13, 15 are forwarded to a first processing unit 17 for conventional processing, typically including A/D conversion, signal conditioning, etc. The processed data are forwarded to a second processing unit 19, which is connected to a memory unit 21 and normally at least one display unit 23 and/or viewfinder.

The memory unit 21, or another memory unit within the camera, may include computer executable instructions for performing the functions that will be discussed below for focusing the IR camera. The processor 19 is arranged to run the program stored on memory unit 19 in order to focus the IR camera.

The IR and visible light optical subsystems will be positioned at the camera at a distance from each other and in fixed positions relative to each other. Because of this, a parallax will be introduced between the visual image captured by the visible light imaging array 13 and the IR image captured by the IR imagining array 15. Also, in an embodiment using the laser device 7, the pixel position of the laser spot in the images will vary because of the parallax. The displacement caused by the parallax will be constant when measured in meters. In pixels, the parallax displacement will decrease with increasing distance z to the object.

The IR and visible light optical subsystems will also have optical axes that are not perfectly parallel. This angular error will also contribute to the displacement, with an error that will be constant measured in the number of pixels but will decrease in meters with the distance z to the object.

Hence, the displacement T between any two images produced by the IR and visible light optical subsystems can be expressed as $$T = c1/z + c2$$

Where c1 is a constant representing the parallax, c2 is a constant depending on the angular difference between the optical axes and z is the distance to the object. Normally a horizontal displacement $T_x$ and a vertical displacement $T_y$ are calculated separately. If c1 and c2 are determined, for example during calibration, the displacement T can be used to determine the distance z. Hence, the displacement of a feature between the image produced by the IR optical subsystem and the image produced by the visible light optical subsystem may be used to determine the focusing distance.

In an embodiment with the optional laser device 7, the laser spot may not be detected in the IR image. It is, however, easily detectable in the visual light image. Therefore, in practice, the displacement of the laser spot in the visual light image may be used to determine the focusing distance. For example, the displacement of the laser spot in the visual light image with respect to a predetermined pixel position in the visual light image may be used to determine the parallax, which can then be used to determine the focus distance.

In alternative embodiments without the laser device 7, the displacement between the IR image and the visual light image may be used to determine the focusing distance. Alternatively, the displacement of a particular feature present in both the IR image and the visual light image may also be used to determine the focusing distance according to the invention.

Figure 2:
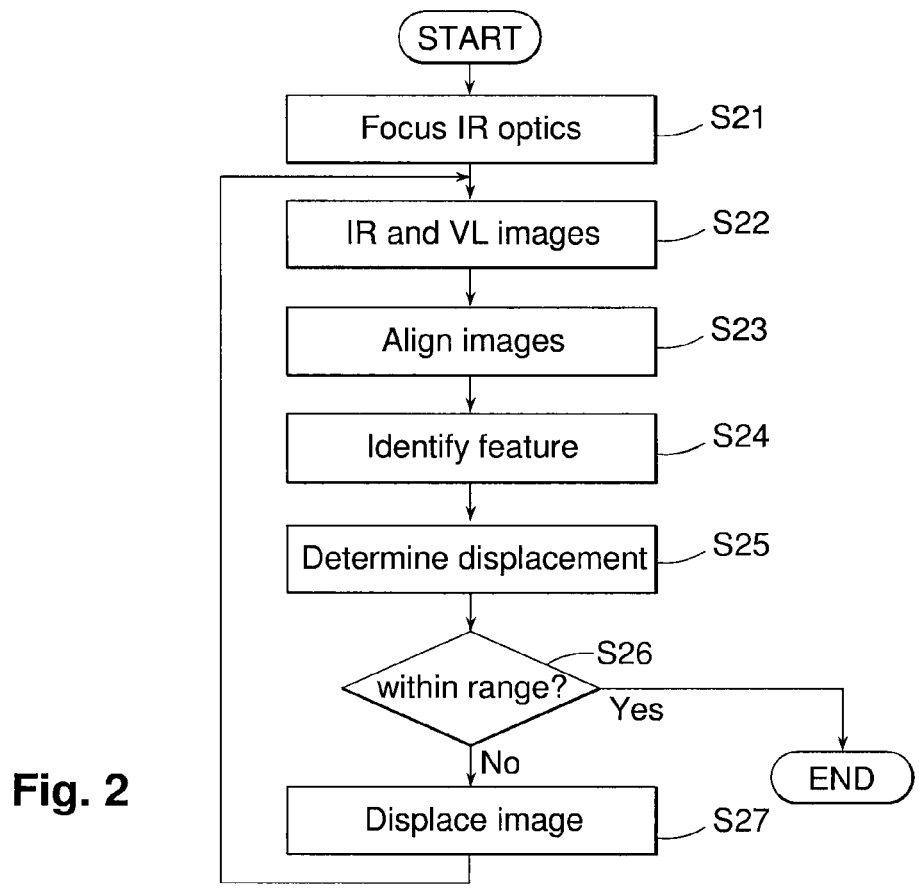
FIG. 2 is a flow chart of a method according to a first exemplary embodiment of the invention.

FIG. 2 is a flow chart of a method according a first exemplary embodiment of the invention. It is assumed that the focusing of the visual optics is fixed, or that autofocus of the visual optics is performed according to some prior art method.

In step S21, which is an optional step, a first, coarse focusing of the IR optics is performed to facilitate step S24.

In step S22, an IR image and a visual light image are taken at substantially the same point in time.

In step S23, the images are aligned using methods known in the art.

In step S24, a suitable feature or distinct characteristic that can be detected in both images is identified. This may be, for example, a sharp edge of an object. This may be performed by image processing methods that are known in the art.

In step S25, the displacement between the feature identified in step S24 in the visible light image and the IR image is determined. The relative positions of the displaced features determine the direction of the focus adjustment needed to achieve a sufficiently small displacement.

In step S26, it is determined if the displacement is within a predefined acceptable range. If yes, end of procedure, if no, go to step S27.

In step S27, one of the images, preferably the IR image, is displaced along the line of displacement. As discussed above, this line of displacement is determined by the relative position of the IR optics and the visible light optics on the camera. The displacement is effectively carried out by refocusing the IR image some small amount that may either be predetermined or determined by analyzing the displacements calculated in S25. The focus adjustment may be achieved by means of the focus motor. If a focus function is available for the visual light imaging system, this system can be focused instead.

Optionally, an interrupt criterion is applied to avoid an eternal loop between steps S27 and S25. For example, the procedure may be interrupted if the displacement is still not acceptable after a certain number of loops, or after a certain amount of time.

Figure 3:
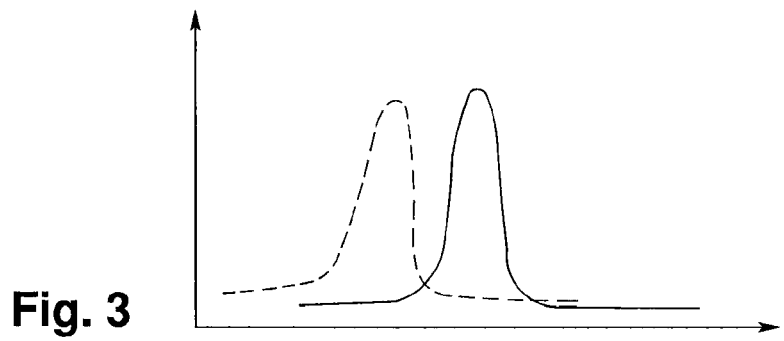
FIG. 3 illustrates varying degrees of overlap between the images.

FIG. 3 illustrates the detection of the overlap by sliding a first curve representing the IR image across a second curve representing the visible light image until a maximum overlap is achieved. The feature identified in step S24 is represented by a peak in each of the curves. The first curve is made to slide across the second curve in the direction of the displacement. As discussed above, this direction is determined by the position of the optical subsystems relative to each other. The position in which the two peaks have a maximum overlap, or the separation between them is minimized, can be easily detected, indicating that the images are aligned.

Figure 4:
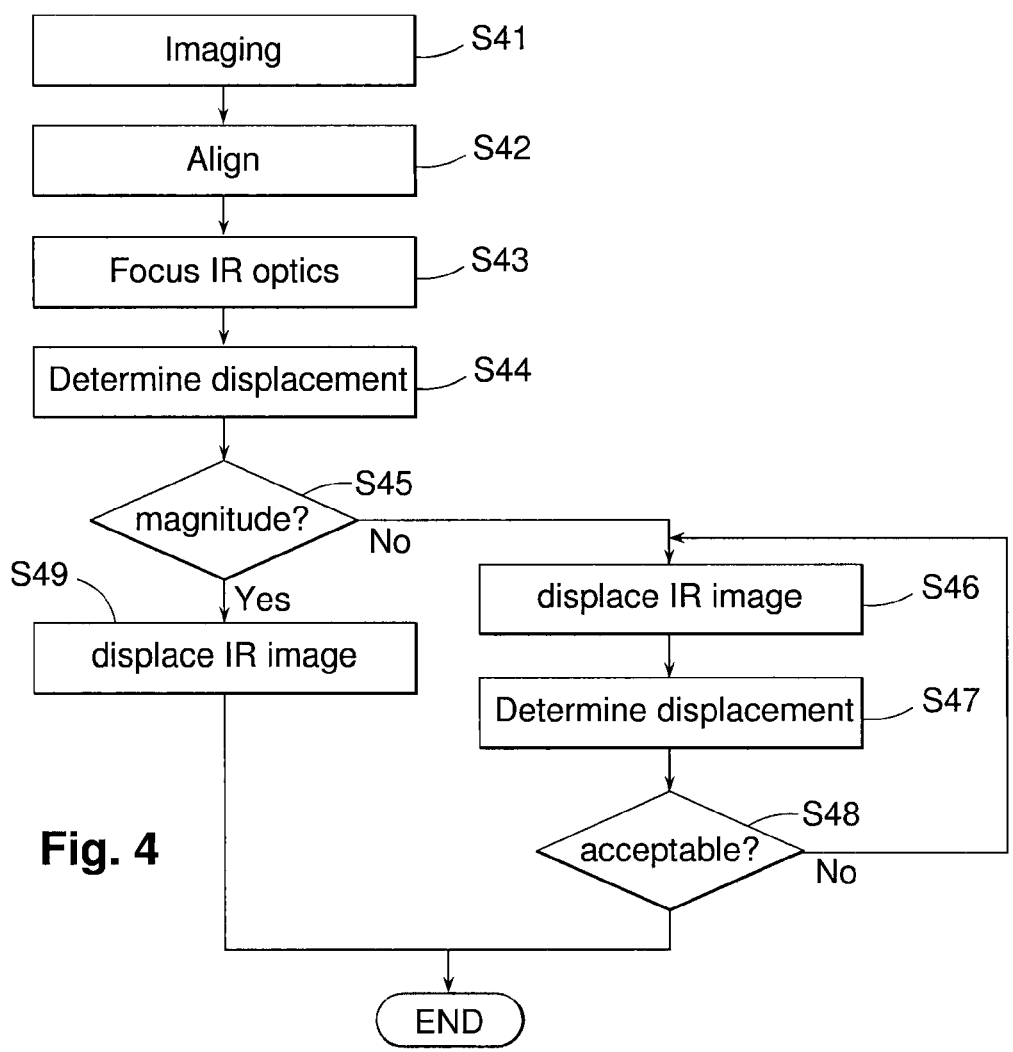
FIG. 4 is a flow chart of a method according to a second exemplary embodiment of the invention.

FIG. 4 is a flow chart of a method according a second exemplary embodiment of the invention.

It is assumed that the focusing of the visual optics is fixed, or that autofocus of the visual optics is performed according to some prior art method.

In step S41, an IR image and a visual light image are taken at substantially the same point in time.

In step S42, the images are aligned using methods known in the art.

In step S43, optionally, a first, coarse focusing of the IR optics is performed, according to a prior art method.

In step S44, the displacement between the IR and visual light images is determined based on the position of a common feature in the images. In a simple variant of the embodiment the result may be only the direction of the displacement. Alternatively, both the direction and the magnitude of the displacement may be given.

In step S45, if only the direction is given in the result of S44, go to step S46; if the direction and the magnitude are given, go to step S49.

In step S46, the IR image is displaced in the determined direction. This is effectively done by changing the focus of the IR image by means of the focus motor.

In step S47, the displacement between the visible light image and the IR image after performing step S46 is determined.

In step S48, if the displacement is within a predefined acceptable range, the procedure ends; otherwise, return to step S46.

In step S49, the IR image is displaced by the determined magnitude in the determined direction. End of procedure.

Alternatively, after step S49 a check may be performed to see that the resulting focus is acceptable and, if not, adjustments may be performed according to steps S46 and S47.

Figure 5:
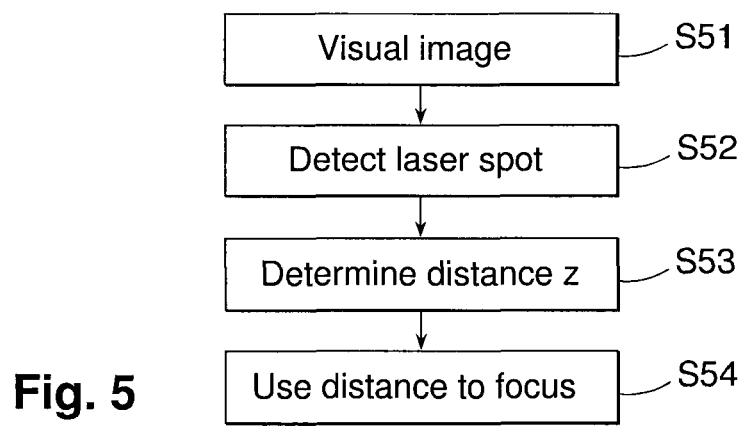
FIG. 5 is a flow chart of a method according to a third exemplary embodiment of the invention.

FIG. 5 is a flow chart of a method according a third exemplary embodiment of the invention. In this embodiment it is assumed that the IR camera also comprises a laser device for producing a laser spot in the visible light image.

In step S51, a visual image is detected by a visible light imaging system of the camera, and a laser spot is generated on the object.

In step S52, the position of the laser spot in the visual image is detected. The laser spot could be detected by any suitable method. One simple method would be to detect the brightest spot in image.

In step S53, the displacement of the laser spot in the visual image is used to determine the distance from the camera to the object.

In step S54, the distance is used to focus the IR optical subsystem by controlling the focus motor.

The displacement of the laser spot can be used in step S53 on the basis of calibration data obtained during calibration of the camera. For example, the laser spot's displacement in the visual light image with respect to a fixed pixel position in the visual light image may be used to determine the parallax as described below.

When calibrating the camera, the laser point is projected on two different subdued white boards at well known distances. The laser coordinates from these boards can be used to calculate the parameters in the equations below:

$$T_x = c_{1x}/z + c_{2x}$$

$$T_y = c_{1y}/z + c_{2y}$$

Similar equations can be used to determine the displacement between the visible light image and the IR image, but the constants will of course be different.

In both cases, $T_x$, $T_y$ are the displacement in the horizontal and vertical direction, respectively, z is the distance from the camera to the object, $c_{1x}$, $c_{1y}$ are constants depending on the parallax caused by the distance between the laser source and the visible light imaging system of the camera, and $c_{2x}$, $c_{2y}$ are constants depending on the angle between the laser source and the visible light imaging system (or the visible light imaging system and the IR imaging system) of the camera. During calibration, T and z are known, so that only two sets of values of the constants are needed to determine the relationships. If these constants are determined during calibration, the displacement $T_x$, $T_y$ can later be used to determine the focusing distance z. As discussed above the direction of the displacement is known, since it depends on the relative positions of the laser source and the imaging system. Therefore, in a simple variant, only $T_x$ or $T_y$ needs to be calculated to determine the total displacement. Calculating both $T_x$ and $T_y$ may, however, give a more precise value.

The invention claimed is:

1. An infrared ("IR") camera comprising:
   a first optical subsystem for generating an IR image of an object;
   a focusing device for focusing the first optical subsystem;
   a second optical subsystem for generating a visual light image of the object; and
   a processor, wherein the processor is configured to:
      determine a displacement of a feature in the visual light image, wherein the displacement is based on the feature's position in the visual light image relative to a predetermined pixel position in the visual light image or relative to the feature's position in the IR image,
      determine a focus distance to the object and a focus adjustment direction based on the displacement, and
      focus the first optical subsystem on the object by using the focusing device to focus the first optical subsystem based on the focus distance and the focus adjustment direction.

2. The IR camera according to claim 1 further comprising:
   a laser device for generating a laser spot on the object, wherein the feature in the visual light image for determining the displacement is the laser spot.

3. The IR camera according to claim 1, wherein the feature for determining the displacement appears in both the visual light image and the IR image and the processor is further operable to determine the displacement based on the feature's position in the visual light image relative to the feature's position in the IR image.

4. The IR camera according to claim 1, wherein the displacement is derived from a horizontal displacement component or a vertical displacement component.

5. A method of focusing an IR camera comprising:
   generating an IR image of an object using a first optical subsystem;
   generating a visual light image of the object using a second optical subsystem;
   determining a displacement of a feature in the visual light image, wherein the displacement is based on the feature's position in the visual light image relative to a predetermined pixel position in the visual light image or relative to the feature's position in the IR image;
   determining a focus distance to the object and a focus adjustment direction based on the displacement; and
   focusing the first optical subsystem based on the focus distance and the focus adjustment direction.

6. The method according to claim 5 further comprising:
   generating a laser spot on the object, wherein the feature for determining the displacement is the laser spot.

7. The method according to claim 5, wherein:
   the feature for determining the displacement is in both the visual light image and the IR image; and the determining the displacement is based on the feature's position in the visual light image relative to the feature's position in the IR image.

8. The method according to claim 5 further comprising: coarsely focusing the first optical subsystem before focusing the first optical subsystem based on the focus distance.

9. The method according to claim 5, wherein the displacement is derived from a horizontal displacement component or a vertical displacement component.

10. A non-transitory computer-readable storage medium comprising computer executable instructions for:
   generating an IR image of an object using a first optical subsystem;
   generating a visual light image of the object using a second optical subsystem;
   determining a displacement of a feature in the visual light image, wherein the displacement is based on the feature's position in the visual light image relative to a predetermined pixel position in the visual light image or relative to the feature's position in the IR image;
   determining a focus distance to the object and a focus adjustment direction based on the displacement; and
   focusing the first optical subsystem based on the focus distance and the focus adjustment direction.

11. The computer-readable storage medium of claim 10 further comprising computer executable instructions for:
   generating a laser spot on the object, wherein the feature for determining the displacement is the laser spot.

12. The computer-readable storage medium of claim 10, wherein
   the feature for determining the focus distance appears in both the visual light image and the IR image; and
   the determining the displacement is based on the feature's position in the visual light image relative to the feature's position in the IR image.

13. The computer-readable storage medium of claim 10 further comprising computer executable instructions for:
   coarsely focusing the first optical subsystem before focusing the first optical subsystem based on the focus distance.

14. The computer-readable storage medium of claim 10, wherein the displacement is derived from a horizontal displacement component or a vertical displacement component.

* * * * *